United States Patent
Leone

(10) Patent No.: US 9,584,381 B1
(45) Date of Patent: Feb. 28, 2017

(54) DYNAMIC SNAPSHOT VALUE BY TURN FOR CONTINUOUS PACKET CAPTURE

(71) Applicant: ExtraHop Networks, Inc., Seattle, WA (US)

(72) Inventor: Alexander Christian Leone, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 15/289,760

(22) Filed: Oct. 10, 2016

(51) Int. Cl.
*H04L 12/28* (2006.01)
*H04L 12/26* (2006.01)
*H04J 1/16* (2006.01)

(52) U.S. Cl.
CPC ........... *H04L 43/04* (2013.01); *H04L 43/0876* (2013.01); *H04L 43/18* (2013.01)

(58) Field of Classification Search
USPC ................................. 370/252, 389, 401, 463
See application file for complete search history.

(56) References Cited

U.S. PATENT DOCUMENTS

| 8,817,655 | B2* | 8/2014 | Szabo | G06K 9/6267 370/253 |
|---|---|---|---|---|
| 8,848,744 | B1 | 9/2014 | Rothstein et al. | |
| 2005/0091341 | A1 | 4/2005 | Knight et al. | |
| 2012/0216282 | A1* | 8/2012 | Pappu | H04L 63/1416 726/23 |
| 2015/0074462 | A1* | 3/2015 | Jacoby | G06F 11/079 714/37 |

* cited by examiner

*Primary Examiner* — John Pezzlo
(74) *Attorney, Agent, or Firm* — John W. Branch; Lowe Graham Jones PLLC

(57) ABSTRACT

Embodiments are directed to capturing packets on a network. A snapshot value may be provided for a network monitoring computer (NMC). If the NMC may be provided packets of a network flow, characteristics of the network flow may be monitored. If the characteristics of the network flow indicate that a flow turn may be occurring on the network flow, the snapshot value may be modified by increasing it to a provided value. If conditions indicate that the flow turn may be complete, the snapshot value maybe reset by decreasing it to another provided value. A portion of each of the packets may be captured by the NMC, such that the size of the portion may be equivalent to the snapshot value. The captured portion of each of the packets may be stored in a memory of the NMC.

30 Claims, 10 Drawing Sheets

US 9,584,381 B1

DYNAMIC SNAPSHOT VALUE BY TURN FOR CONTINUOUS PACKET CAPTURE

TECHNICAL FIELD

The present invention relates generally to network monitoring, and more particularly, but not exclusively, to monitoring network traffic in a distributed network environment.

BACKGROUND

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software agent running on the client or server. In virtual environments, port mirroring may be performed on a virtual switch that is incorporated within the hypervisor.

In some instances, a proxy is actively arranged between two endpoints, such as a client device and a server device. The proxy intercepts each packet sent by each endpoint and optionally transforms and forwards the payload to the other endpoint. Proxies often enable a variety of additional services such as load balancing, caching, content filtering, and access control. In some instances, the proxy may operate as a network monitor. In other instances, the proxy may forward a copy of the packets to a separate network monitor.

In some networks, packet capture devices maybe installed. Packet capture devices may be arranged capture and store network packets for subsequent analysis. However, the sheer amount of data communicated over networks results in a prohibitively high number of network packets. Accordingly, packets and/or portions of packets may be selectively captured to reduce data storage requirements. In addition, as information technology infrastructure becomes more complex and more dynamic, there may be numerous packet types and formats for the various different types of network protocols and applications that may be carried on modern networks that may it difficult for effective network packet capture. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF THE EMBODIMENTS

Figure 1:
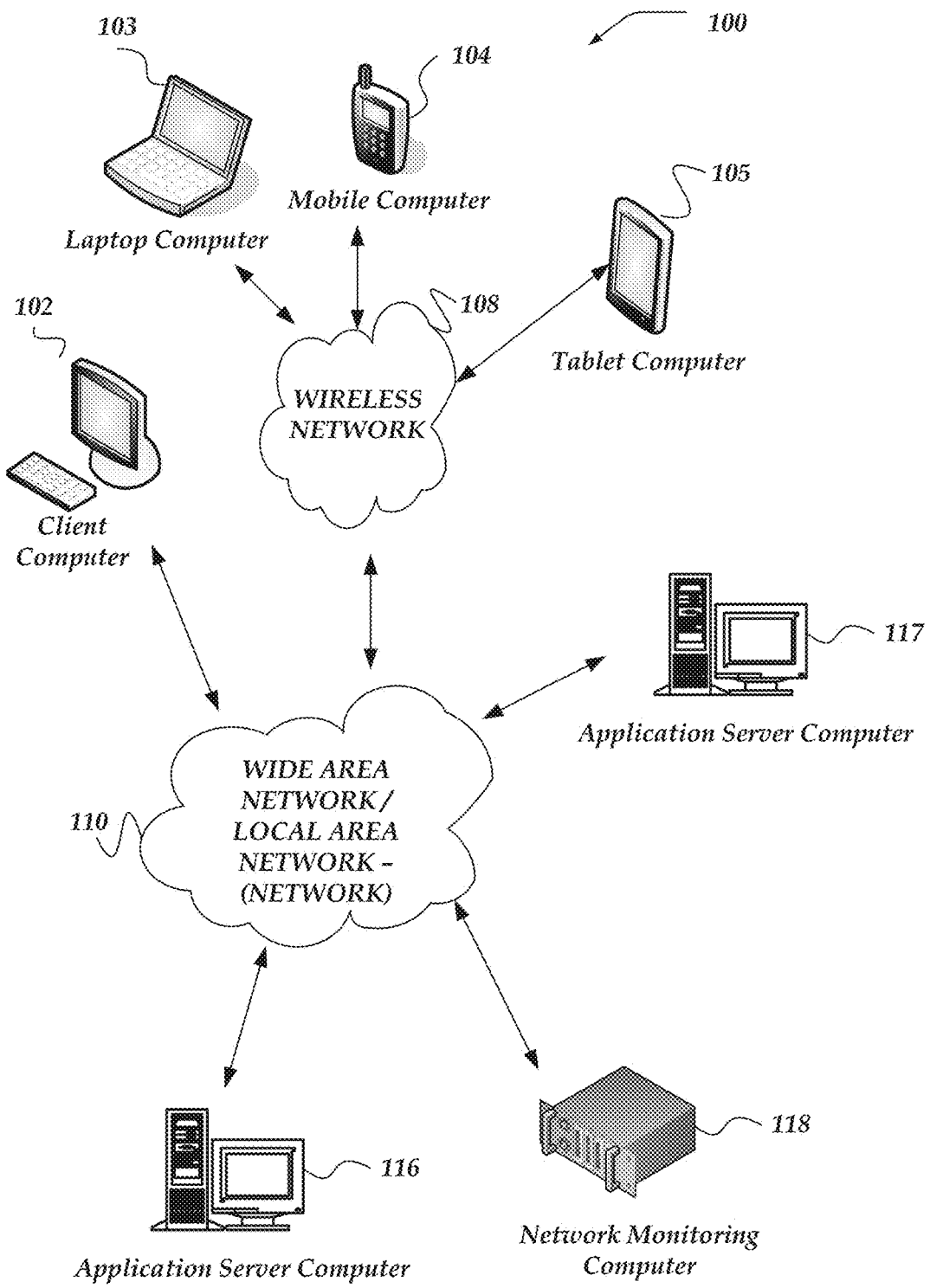
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In at least one of the various embodiments, flows may be useful if one or more of the endpoints of a session may be behind a network traffic management device, such as a firewall, switch, router, load balancer, or the like. In at least one of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the terms "tuple," "tuple information" refer to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows.

As used herein the terms, "related flows," or "related network flows" refer to network flows that while separate operate cooperatively. For example, some protocols, such as, FTP, SIP, RTP, VIOP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In at least one embodiment, the NMC may passively monitor network packet traffic without participating in the communication protocols. This monitoring may be performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client and/or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated and/or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In at least one of the various embodiments, NMCs and/or NMC functionality may be implemented using hardware or software based proxy devices that may be arranged to intercept network traffic in the monitored networks.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from four to seven, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the terms "network flow turn", "flow turn," and "turn" refer to the instant when a network flow changes direction. NMCs may be arranged to implement traffic analysis that includes turn detection. Turn detection may include analyzing the monitored flow to determine if data is flowing in one direction (e.g., from network endpoint A to network endpoint B) followed by change of flow direction may, for some protocols, indicate a request-response pattern. In other protocols every other turn may correspond to a new transaction. If a turn is detected, the NMC may be arranged to search for a known sequence or pattern that corresponds to the protocol request or response at the beginning of the turn. NMCs may be configured to use various metrics for identifying a turn, such as, changes in traffic flow rate, changes in traffic flow value, sequence matching, response delay/latency, or the like, or combination thereof. Accordingly, one or more threshold value may be configured for detecting turns. Also, knowledge of the particular protocol, application, or the like, may be employed using rules/conditions to help detect turns. In some embodiments, one or more metrics, threshold values, rules, or the like, may be combined together to provide heuristics that may be used for detecting turns.

As used herein the terms "SnapLen," "Snap Length," or "snapshot value" refer to a value that defines the amount of data captured from a network packet by an NMC or other packet capture device. Snapshot value may set to an arbitrary value up to or exceeding the length of the network packet. In other cases, snapshot value may be set to be less than the size of network packet. In some cases, the snapshot value may be set to capture the entire network packet regardless of its length. Snapshot value may be measured from the beginning of a network packet. However, the capturing system (e.g., an NMC) may be configured to begin counting traffic after a defined offset position in the packet. For example, for TCP protocol packets an NMC may be configured to use a snapshot value of 512 bytes starting from the TCP header thus excluding the IP header information from the snapshot value count. Other snapshot value configurations may be defined as well. In some cases, capturing data from network packets using a snapshot value to limit the number of bytes captured may be referred to as packet slicing. In some embodiments, a snapshot value may be a data structure that includes additional properties. Also, in some cases, a snapshot value may be defined based on time duration rather than byte count.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to capturing packets on a network. In at least one of the various embodiments, a snapshot value may be provided for one or more network monitoring computers (NMCs).

In at least one of the various embodiments, if the one or more NMCs are provided one or more packets of a network flow, further actions may be performed.

In at least one of the various embodiments, one or more characteristics of the network flow may be monitored, such that the one or more characteristics include an incoming traffic volume, an outgoing traffic volume of the network flow, or the like.

In at least one of the various embodiments, the monitoring of the one or more characteristics of the network flow, may include monitoring one or more of changes in traffic volume rate, sequence matching, response delay, protocol state, response latency, or the like.

Accordingly, in at least one of the various embodiments, the flow turn may be identified based on a change of direction of the network traffic in the network flow, such that the change of direction may be discovered based on the one or more characteristics.

In at least one of the various embodiments, if the one or more characteristics of the network flow indicate that a flow turn may be occurring on the network flow, the snapshot value may be modified by increasing it to a provided value. In at least one of the various embodiments, modifying the snapshot value may include, providing a value used to increase the snapshot value based on one or more of a network protocol used by the network flow, or an application protocol used by the network flow. Also, in at least one of the various embodiments, modifying the snapshot value by increasing it to the provided value may include, modifying the snapshot value to a value that enables entire packets to be captured.

In at least one of the various embodiments, if one or more conditions indicate that the flow turn may be complete, the snapshot value maybe reset by decreasing it to another provided value. In at least one of the various embodiments, the one or more conditions may include, one or more of a count of captured network packets subsequent to the occurrence of the turn exceeds a defined threshold, a timeout expiry, exceeding a capture byte count threshold, or the like.

In at least one of the various embodiments, a portion of each of the one or more packets may be captured by the NMC, such that the size of the portion may be equivalent to the snapshot value.

In at least one of the various embodiments, the captured portion of each of the one or more packets may be stored in a memory of the NMC.

In at least one of the various embodiments, the one or more packets may be stored in a memory buffer. Accordingly, in at least one of the various embodiments, if the flow turn is occurring, the one or more packets in the memory buffer may be recaptured using the modified snapshot value. In at least one of the various embodiments, if the memory buffer size may be exceeded, one or more of the buffered one or more packets may be discarded to make more room in the memory buffer.

In at least one of the various embodiments, if a new network flow may be provided to the NMC, the snapshot value may be modified by increasing it to the provided value; and a portion of each of the one or more packets may be captured, such that the size of the portion may be equivalent to the snapshot value.

In at least one of the various embodiments, the one or more packets may be provided from an off-line data store.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Application Server Computer 116, Application Server Computer 117, Network monitoring computer 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, application server computer 117, network monitoring computer 118, or other computers.

Client computers 102-105 may further be configured to include a client application that enables an end-user to log into an end-user account that may be managed by another computer, such as application server computer 116, application server computer 117, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to network monitoring computer 118. Also, client computers may be arranged to enable users to display reports, interactive user-interfaces, and/or results provided by network monitoring computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, application server computer 117, network monitoring computer 118, client computers 102-105 through wireless network 108, or the like. Network 110 is enabled to employ any form of computer readable media for communicating information from one electronic device to another.

Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 and/or application server computer 117 is described in more detail below in conjunction with FIG. 3. Briefly, however, application server computer 116-117 includes virtually any network computer capable of hosting applications and/or providing services in network environment.

One embodiment of network monitoring computer 118 is described in more detail below in conjunction with FIG. 3. Briefly, however, network monitoring computer 118 may include include virtually any network computer capable of passively monitoring communication traffic and/or capturing network packets in a network environment.

Although FIG. 1 illustrates application server computer 116, application server computer 117, and network monitor device 118, each as a single computer, the innovations and/or embodiments are not so limited. For example, one or more functions of application server computers 116-117, and/or network monitoring computer 118, or the like, may be distributed across one or more distinct network computers. Moreover, in at least one embodiment, network monitoring computer 118 may be implemented using a plurality of network computers. Further, in at least one of the various embodiments, application server computers 116-117, and/or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
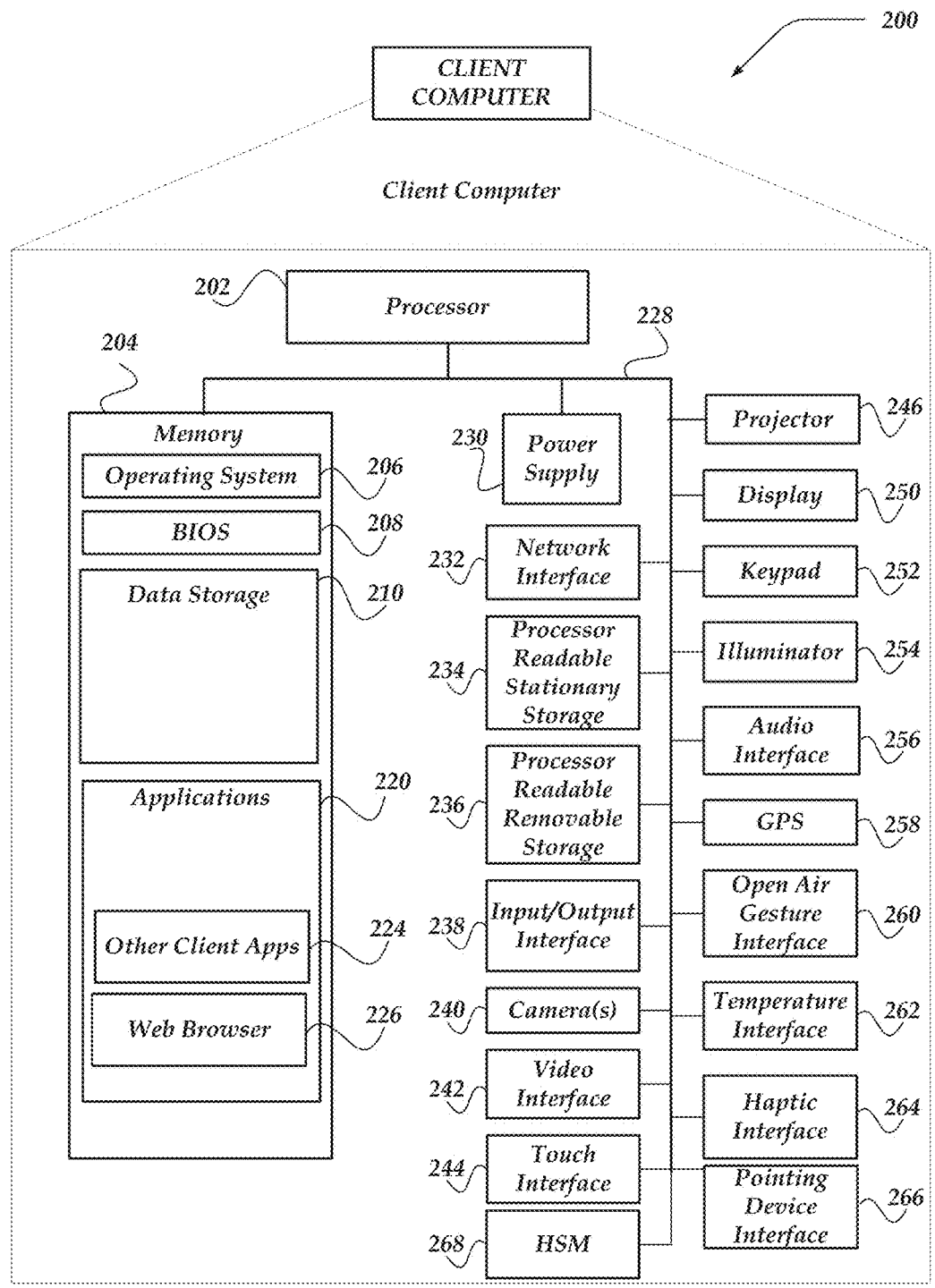
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers and/or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The one or more embedded logic hardware devices may directly execute embedded logic to perform actions. Also, in one or more embodiments (not shown in the figures), client computer 200 may include one or more hardware microcontrollers instead of one or more CPUs. In at least one embodiment, the one or more microcontrollers may directly execute their own embedded logic to perform actions and access its own internal memory and its own external Input and Output Interfaces (e.g., hardware pins and/or wireless transceivers) to perform actions as a System On a Chip (SOC), or the like.

Illustrative Network Computer

Figure 3:
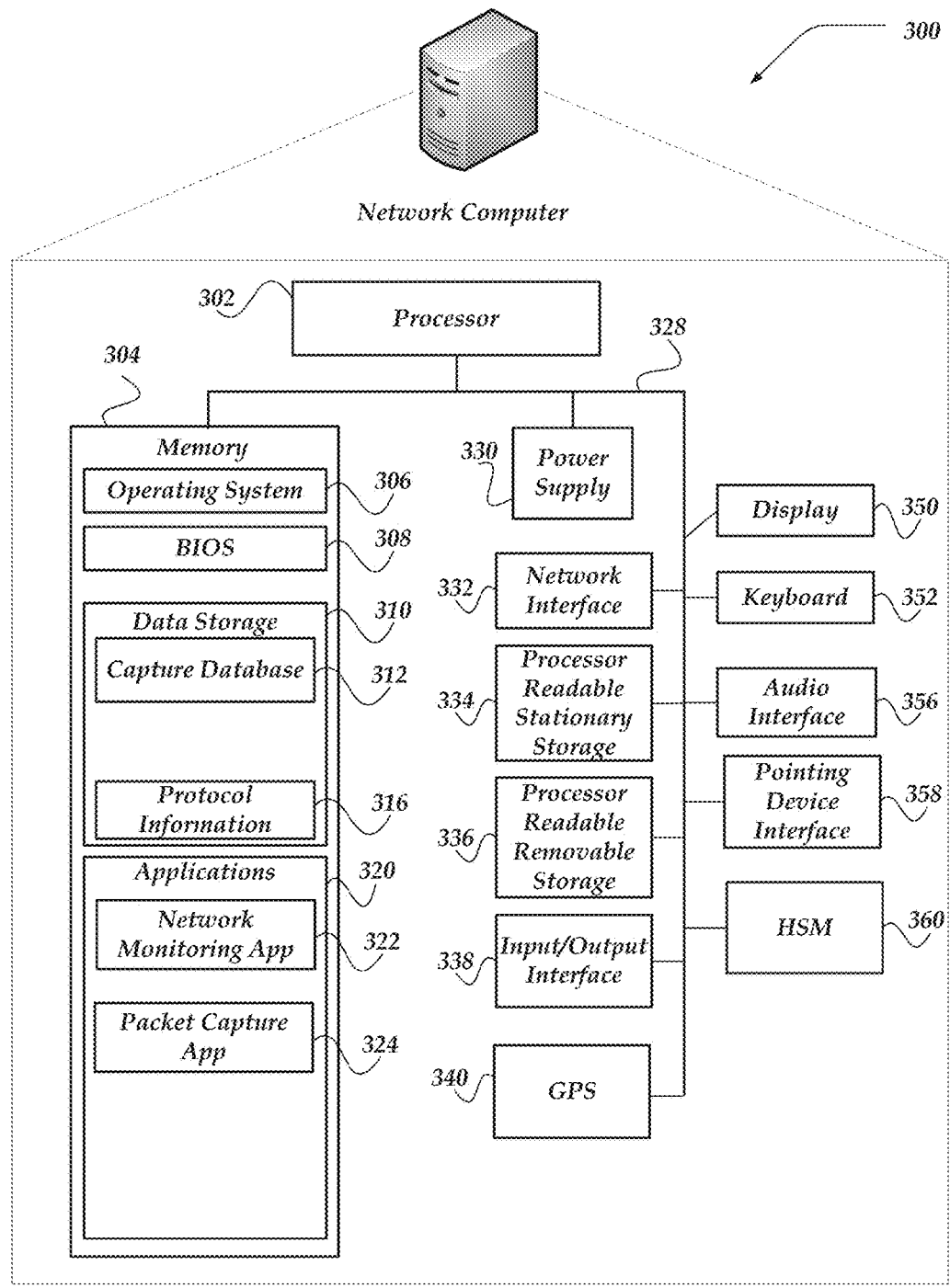
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computers 116-117 and/or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In at least one embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, capture database 312, protocol information 316, or the like. Capture database 312 may be a data store that contains one or more records, logs, events, network packets, network packet portions, or the like, produced during monitoring of the networks. And, protocol information 316 may store various rules and/or configuration information related to one or more network communication protocols that may be employed, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, databases, web services, and so forth. Applications 320 may include network monitoring application 322 and packet capture application 324 that perform actions further described below. In at least one of the various embodiments, one or more of the applications may be implemented as modules and/or components of another application. Further, in at least one of the various embodiments, applications may be implemented as operating system extensions, modules, plugins, or the like.

Furthermore, in at least one of the various embodiments, network monitoring application 322 and packet capture application 324 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to network monitoring application 322 and/or packet capture application 324 may be provisioned and de-commissioned automatically.

Also, in at least one of the various embodiments, network monitoring application 322 and/or packet capture application 324, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The one or more embedded logic hardware devices may directly execute embedded logic to perform actions.

Also, in one or more embodiments (not shown in the figures), network computer 300 may include one or more hardware microcontrollers instead of one or more CPUs. In at least one embodiment, the one or more microcontrollers may directly execute their own embedded logic to perform actions and access its own internal memory and its own external Input and Output Interfaces (e.g., hardware pins and/or wireless transceivers) to perform actions as a System On a Chip (SOC), or the like.

Illustrative Logical System Architecture

Figure 4:
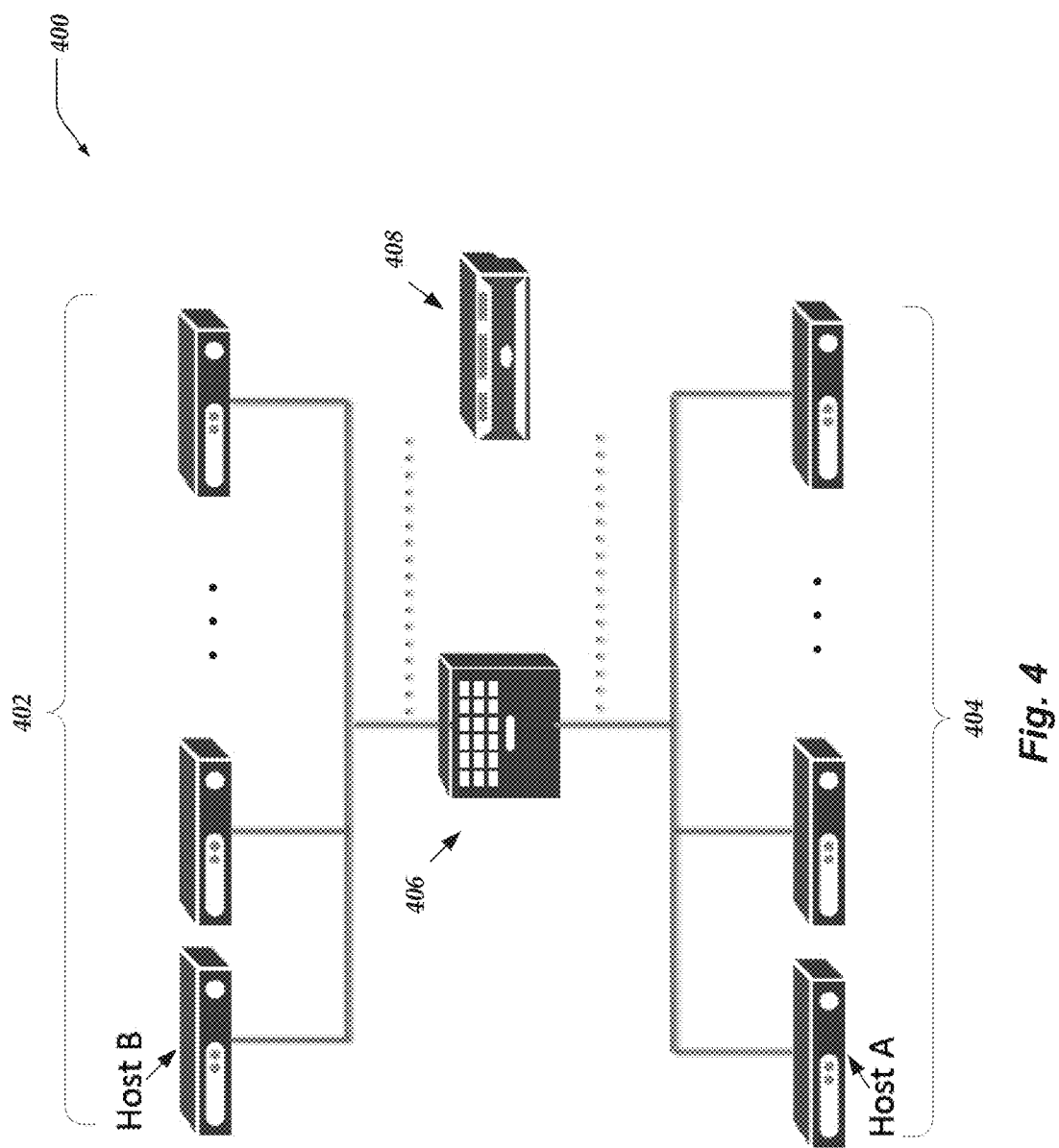
FIG. 4 illustrates a logical architecture of a system for continuous packet capture using dynamic snapshot value for in accordance with at least one of the various embodiments.

FIG. 4 illustrates a logical architecture of system 400 for continuous packet capture using dynamic snapshot values for in accordance with at least one of the various embodiments. System 400 may be arranged to include a plurality of network devices and/or network computers on first network 402 and a plurality of network devices and/or network computers on second network 404. Communication between the first network and the second network is managed by switch 406. Also, NMC 408 may be arranged to passively monitor and/or capture packets (network packets) communicated in network connection flows between network devices and/or network computers on first network 402 and second network 404. For example, the communication of flows of packets between the Host B network computer and the Host A network computer are managed by switch 406 and NMC 408 may be passively monitoring and recording some or all of the network traffic comprising these flows. Also, NMC 408 or other NMCs may be arranged to passively monitor network communication between and among hosts that are on the same network, such as, network computers 402.

NMC 408 may be arranged to receive network traffic for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

In at least one of the various embodiments, NMCs, such as, NMC 408 may be arranged to capture data from some or all observed network flows. In modern high-speed/high-volume networks the data storage required for storing the captured data may easily exceed reasonable limits and/or otherwise become impractical. For example, for some embodiments, while 24 hours of captured Ethernet (10Base-X) network traffic may only require 0.10 Terabytes of data storage; 24 hours of captured 10 Gigabit Ethernet (10 GBase-X) network traffic may require 10.2 Terabytes of data storage; and 24 hours of captured 100 Gigabit Ethernet (100 GBase-X) network traffic may require 1054 Terabytes of data storage.

Accordingly, in some embodiments, NMC 408 may be arranged to use a snapshot value value that establishes a maximum value of bytes to capture per packet. In some embodiments, if a snapshot value is less than the length of a network packet, data storage volume requirements may be reduced at the expense of capturing only portions of the network packets comprising the network traffic. For example, if an NMC (or other packet capture device) is configured to use a snapshot value of 128 bytes, the first 128 bytes of observed network packets may be captured and stored rather than the entire network packet. In some cases, this may be sufficient because much of the interesting information in a given network packet may often be header information included at the beginning of the packet. Further, in some embodiments, using snapshot value to reduce storage requirements comes at the expense of information completeness since the portions of the network packets not found within the snapshot value may be discarded.

Accordingly, in at least one of the various embodiments, NMCs, such as, NMC 408 may be arranged to set a snapshot value according to one or more defined policies. For example, in some embodiments, NMCs may be arranged to selectively set snapshot values based on various factors, such as, network protocol, application protocol, application type, traffic rate, tuple information (e.g., source/destination address, port, VLAN, or the like), other rule-based conditions being met, or the like, or combination thereof.

In at least one of the various embodiments, an NMC, such as, NMC 408 may be arranged to passively observe both directions of network flows. Accordingly, an NMC may be arranged to observe the network conversation between different endpoints in the monitored network. In some embodiments, NMCs may be arranged to monitor both directions of a transaction based traffic between endpoints. Accordingly, in at least one of the various embodiments, NMCs may be arranged to identify network flows that may be using request/response protocols.

In at least one of the various embodiments, NMC may be arranged to monitor both directions of communication of network flow to determine if a turn has occurred. As defined above, a turn refers to the instant when a network flow changes direction. In some embodiments, the NMC may be arranged to observe when servers acknowledge and respond to requests from clients. NMCs may be arranged to employ configuration and/or rules that are used to determine if there is a turn. In some embodiments, the NMCs may track protocol state information for both ends of a network flow to identify turns. For example, common network protocols, such as, TCP have well known transactional behavior that may be observed by an NMC.

As described above, in at least one of the various embodiments, NMCs may be arranged to monitor network flows to observe and/or record various metrics associated with the flow traffic. In some embodiments, metrics, such as, traffic rate, changes in traffic rate, latency, traffic volume, or the like, or combination thereof, may be employed to identify turns. Further, since the NMC has access to the wire traffic, it has access to the entire OSI layer stack. Accordingly, metrics collected at lower layers may be correlated with information from higher layers to characterize network traffic and identify turns.

Further, in some embodiments, NMCs may be arranged to recognize and understand various well-known application level protocols, such as, HTTP, SMTP, FTP, DNS, POP3, IMPAP, or the like. Accordingly, in at least one of the various embodiments, NMCs may observe communication between clients and servers and use rules to identify if a turn may be occurring.

Further, in at least one of the various embodiments, NMCs may be arranged to discover network applications, such as, databases, media servers (e.g., video streaming, music streaming, or the like), video conferencing/chatting, VOIP applications, web servers, or the like. Thus, in some embodiments, NMCs may be arranged to monitor the traffic of network flows in the context of the particular applications.

Accordingly, in at least one of the various embodiments, NMCs may be arranged to employ rules or conditions to identify if a turn occurs based on a contextual understanding of the network application. For example, in some embodiments, a NMC may be arranged to identify that a network computer in the network (endpoint B) may be hosting a database application. Accordingly, if the NMC observes endpoint A sending a database query to endpoint B, endpoint B's response may indicate a turn has occurred.

Accordingly, in at least one of the various embodiments, NMCs that are configured to capture network traffic may be arranged to selectively modify the snapshot value used during packet capture based on the occurrence of network flow turns. In some embodiments, for some applications, it may be understood that the network traffic occurring near a turn that may be of interest to real-time or forensic network packet analysis.

For example, network traffic near the turn may include a client's request and the initial responses of the server. Thus, in at least one of the various embodiments, it may be advantageous to increase the snapshot value near turns so a more complete record of the most interesting part of the network transaction may be captured. Likewise, in some embodiments, it may be advantageous to reduce the snapshot value for traffic unassociated with a turn.

For example, if a client provides a request to download a 5 GB video from server, the client's request and the initial response from the server may be interesting. It may be of interest because it may include the client request parameters, credentials, and so on, while the initial server response may include error response, acknowledgments, authentication results, or the like. Whereas, in this example, once the video begins to download, the gigabytes of payload associated with the requested video may not be of much interest for the purposes of monitoring network performance.

In at least one of the various embodiments, NMCs may be arranged to employ various conditions, rules, pattern matching, heuristics, or the like, or combination thereof, implemented using scripts, compiled computer languages, ASICs, FGPAs, PALs, or the like, or combination thereof. In some embodiments, NMCs may be arranged include one or more conditions, rules, pattern matching, heuristics, or the like, that may be arranged to identify protocols, applications, turns, or the like, for various known network protocols, application protocols, network applications, or the like. Also, in at least one of the various embodiments, NMCs may be arranged enable user to install additional custom/specialized conditions, rules, pattern matching, heuristics, or the like, to identify other protocols, applications, network applications, turns, and so on.

Figure 5:
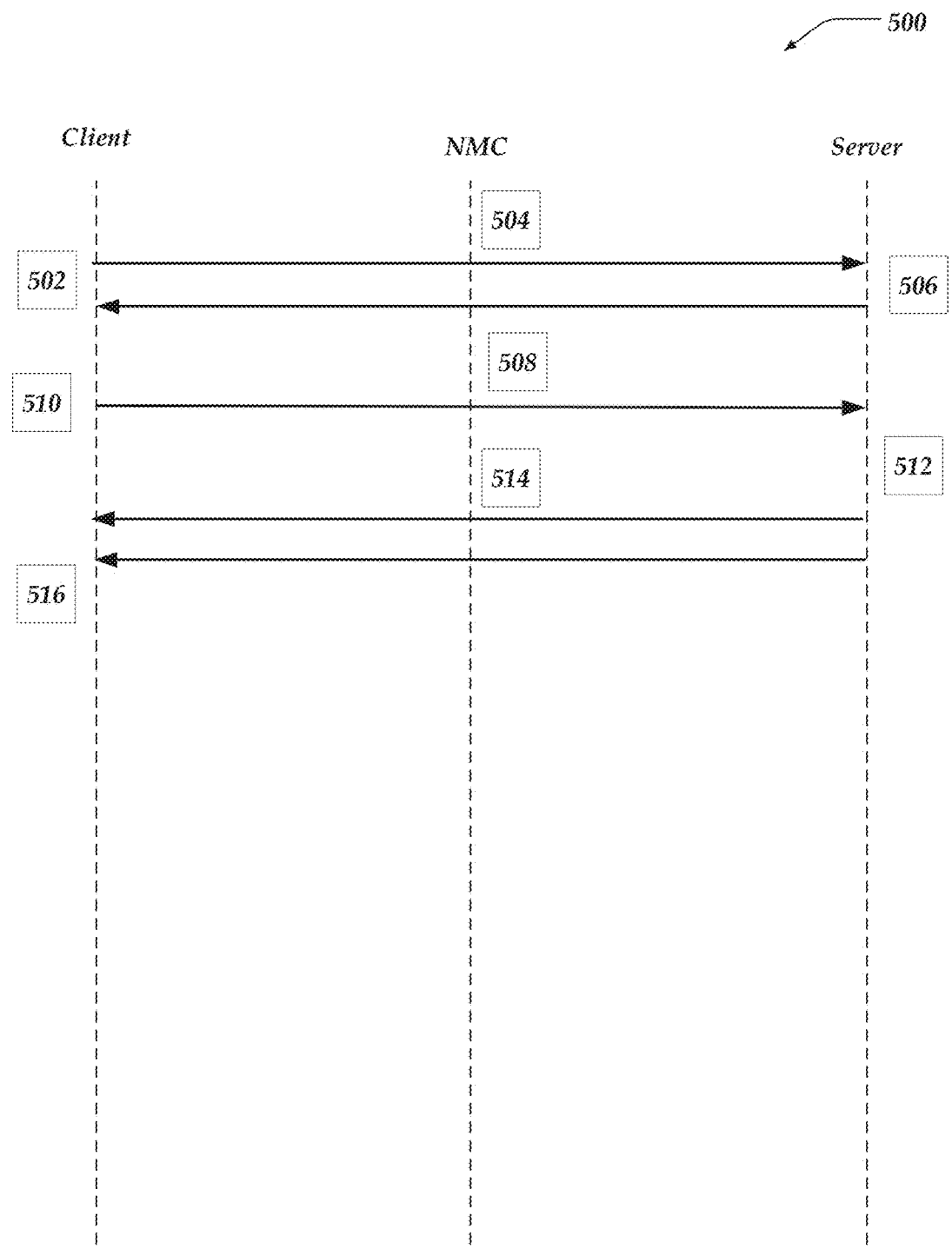
FIG. 5 is a logical sequence diagram representing a sequence showing dynamic snapshot value selection in accordance with at least one of the various embodiments.

FIG. 5 is a logical sequence diagram representing sequence 500 showing dynamic snapshot value selection in accordance with at least one of the various embodiments. In at least one of the various embodiments, sequence 500 illustrates network traffic exchanged by a client and a server with a NMC disposed to monitor both directions of the network traffic. Also, for this example, the NMC may be configured to perform network packet capturing on the network. As such, it may be configured to use a default/normal snapshot value to reduce data storage requirements for packet capture operations.

At step 502, in at least one of the various embodiments, a client may be communicating over a network with a server. At step 504, in at least one of the various embodiments, the NMC may be arranged to monitor the network traffic between the client and server. Also, in this example, the NMC may be arranged to capture packets of the network flows used by the client and server. Accordingly, it may capture a portion of each network packet where the portion size is define by the defined normal snapshot value. At step 506, in at least one of the various embodiments, the server may respond based on the client communications.

In this example, the NMC may be arranged to characterize the traffic associated with step 502-506 as uninteresting chatter. For example, this may be heartbeat/watchdog traffic periodically sent over the network.

At step 510, in at least one of the various embodiments, the client may send one or more network packets comprising a request to download a file. At step 508, in at least one of the various embodiments, the NMC may observe that the client looks like it may be sending a request to the server. At step 512, in at least one of the various embodiments, the server may receive the request and prepare a response. In this example, the server may perform various operations to authenticate the client and validate the request; look up the file and prepare it for transfer; and begin sending the response back to the client.

At step 514, in at least one of the various embodiments, the NMC may observe and discover that the server is sending a response to the clients that previously sent requests. In some embodiments, the NMC may determine that a turn is occurring. Accordingly, the NMC may be arranged to increase the snapshot value to enable more of the network packets to be captured since the traffic near the turn has a greater likelihood of being of interest.

Thus, in at least one of the various embodiments, upon detection of a turn, the NMC may set the snapshot value to a different value (usually increasing it.) Also, in some embodiments, the NMC may be configured to capture entire packets rather than using a particular snapshot value that limits the amount of the packet that may be captured. For example, in some embodiments, setting snapshot value to null or zero may indicate that the NMC should capture entire packets.

At step 516, in at least one of the various embodiments, the client continues to download the file data provided by the server. Eventually, depending on one or more defined configurations or policies, the NMC may reset the snapshot value to the normal/default value. For example, the NMC may be arranged to define one or more metric threshold values that if exceeded indicate it may be time to reset the snapshot value back the normal value.

Thus, in this example, for some of the embodiments, the NMC may capture packets using the normal snapshot value and then if a turn occurs it may increase the snapshot value to provide a more complete capture of the network packets. And, then after sometime (or one or more conditions are met), the NMC may reset the snapshot value to the normal value.

In at least one of the various embodiments, the NMC may be arranged to store the entire contents of recently observed network packets in a memory buffer until the NMC makes a determination that a turn has occurred. Thus, the buffered packets comprising the front end of the turn may be captured and stored using the updated/increased snapshot value. Likewise, if the NMC does not discover a turn the excess data in stored in the buffer may be discarded or written over. For example, an NMC may be arranged to include ring buffer that is sized appropriately to enable enhanced capture of the packets comprising the front end of the turn.

Figure 6:
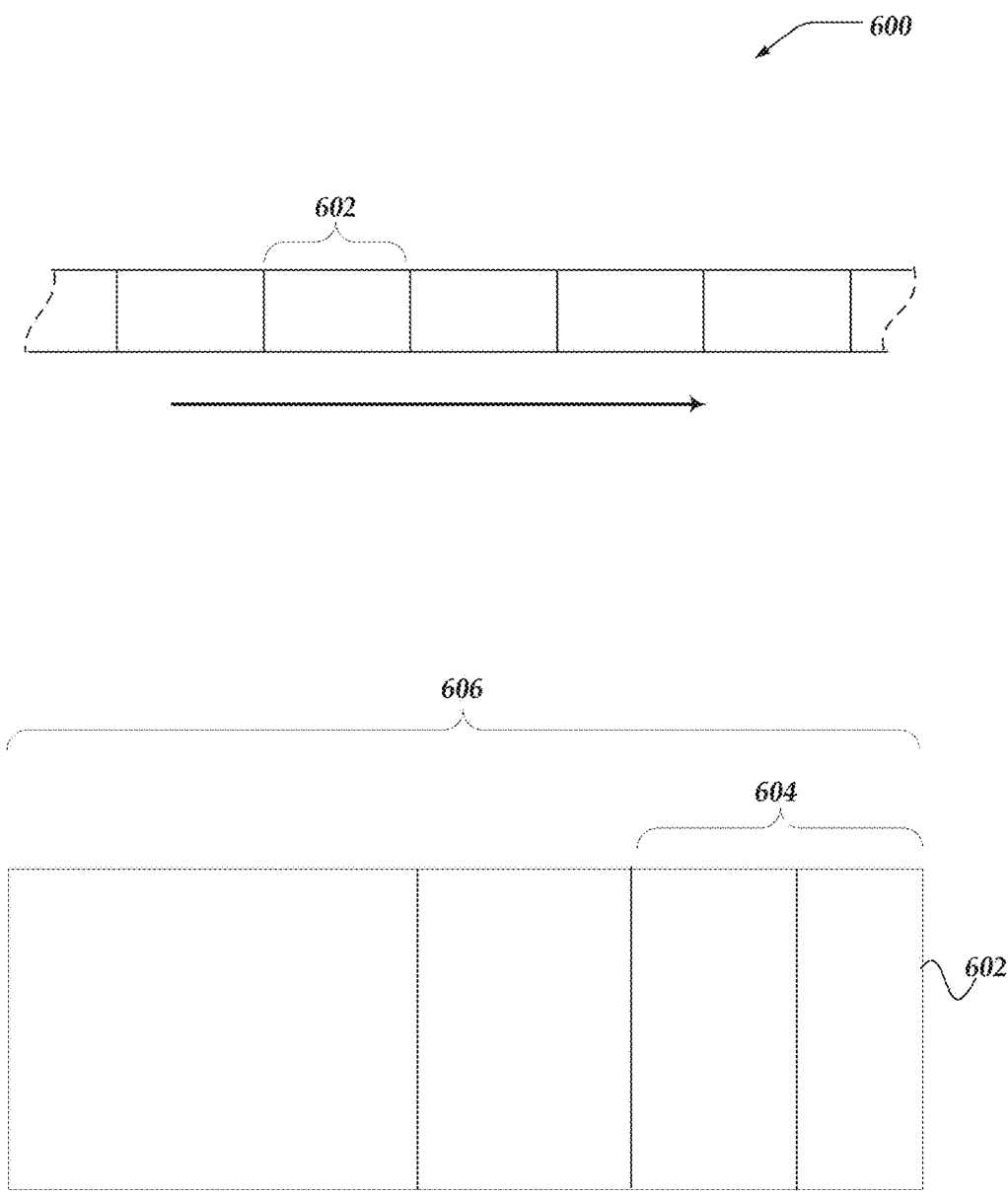
FIG. 6 illustrates a logical schematic of network packets in a network flow in accordance with at least one of the various embodiments.

FIG. 6 illustrates a logical schematic of network packets in network flow 600 in accordance with at least one of the various embodiments. As described above, network flows, such as, network flow 600 may be comprised of multiple network packets that are sent over the network. In this example, network packet 602 represents a single packet in a stream of packets comprising network flow 600.

In some embodiments, an NMC may be configured to use a normal snapshot value that enables the capture of the beginning of a packet. For example, packet portion 604 may represent the portion of network packet 602 that may be captured using the normal snapshot value.

In at least one of the various embodiments, if an NMC determines that a turn has occurred (or is occurring) it may increase the snapshot value so more of network packet is captured. In this example, an NMC may be arranged to set a snapshot value such that packet portion 606 of network packet 602 may be captured if a turn occurs.

Generalized Operations

FIGS. 7-10 represent generalized operations for continuous packet capture using dynamic snapshot value in accordance with at least one of the various embodiments. In at least one of the various embodiments, processes 700, 800, 900, and 1000 described in conjunction with FIGS. 7-10 may be implemented by and/or executed by one or more processors on a single network computer (or network monitoring computer), such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 7-10 may be used for anomaly detection using device relationship graphs in accordance with at least one of the various embodiments and/or architectures such as those described in conjunction with FIGS. 4-6. Further, in at least one of the various embodiments, some or all of the actions performed by processes 700, 800, 900, and 1000 may be executed in part by network monitoring application 322 and/or packet capture application 324 executed by one or more processors of one or more network computers.

Figure 7:
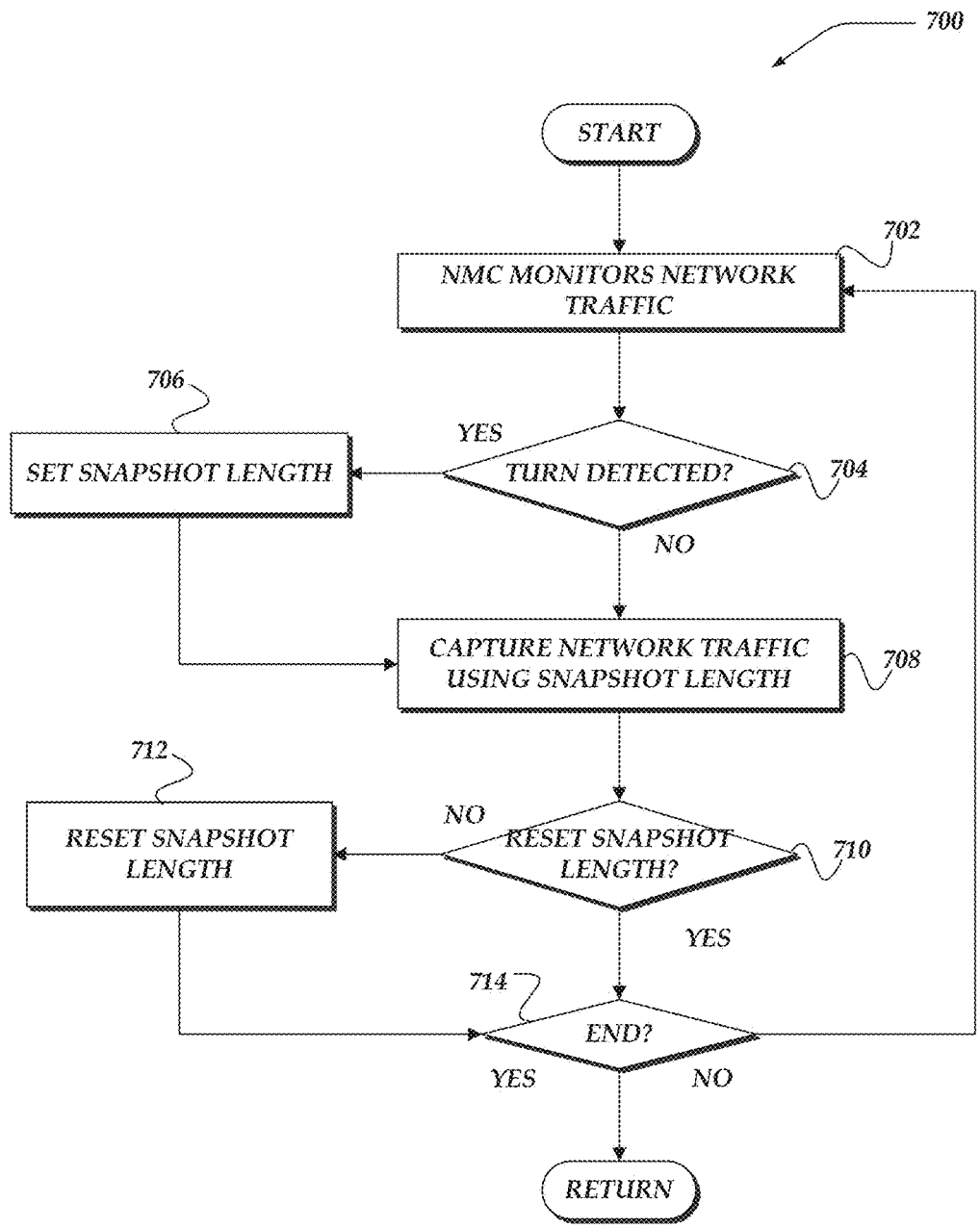
FIG. 7 illustrates an overview flowchart of a process for continuous packet capture using dynamic snapshot value in accordance with at least one of the various embodiments.

FIG. 7 illustrates an overview flowchart of process 700 for continuous packet capture using dynamic snapshot value in accordance with at least one of the various embodiments. After a start block, at block 702, in at least one of the various embodiments, one or more NMCs may be arranged to monitor network traffic on one or more networks. In some embodiments, NMCs, such as, NMC 408 may be arranged to monitor network traffic.

At decision block 704, in at least one of the various embodiments, if a turn is detected by the NMC, control may flow to block 706; otherwise, control may flow to block 708. As described, an NMC may be arranged to perform various operations for detecting turns in the network flows it may be monitoring.

At block 706, in at least one of the various embodiments, since the NMC has indicated that a turn in occurring, the NMC may set the snapshot value to a value appropriate for capturing network packet occurring near a turn in the network flow. In some embodiments, the snapshot value may be increased since the network traffic near the turn may be considered more important. Likewise, for example, the NMC may set the snapshot value to a value that ensures entire network packets are captured. For example, the NMC normal snapshot value may be 128 bytes to enable TCP header information to be capture for all network packets.

Then, for example, the snapshot value may be set to 1500 bytes corresponding to the Maximum Transmission Unit for Ethernet. Alternately, as mentioned above, the NMC may set the snapshot value to a "magic" value that indicates the NMC should capture entire network packets rather than using a fixed length maximum.

At block 708, in at least one of the various embodiments, the NMC may capture observed network packets using the current snapshot value. Accordingly, in some embodiments, all capturing may occur for each network packet, but the current snapshot value will control how much of a network packet is captured and stored.

At decision block 710, in at least one of the various embodiments, if the snapshot value needs to be reset, control may flow block 712; otherwise, control may flow to decision block 714.

In at least one of the various embodiments, as described above, an NMC may be arranged to employ one or more conditions, rules, pattern matching, heuristics, or the like, or combination thereof, implemented using scripts, compiled computer languages, ASICs, FGPAs, PALs, or the like, or combination thereof, to determine if the snapshot value should be reset to normal.

For example, in some embodiments, the NMC may be configured to reset the snapshot value after a defined number of network packets have been captured subsequent to the occurrence of the turn. Likewise, other conditions may include timeout expiry, exceeding a capture byte count threshold, or the like, or combination thereof.

At block 712, in at least one of the various embodiments, the NMC may reset the snapshot value back to the normal value. In some embodiments, the NMC may be arranged to execute one or more conditions, rules, pattern matching, heuristics, or the like, to determine the snapshot value. For example, in some embodiments, the NMC may be arranged to gradually restore the snapshot value to the normal value. Accordingly, in at least one of the various embodiments, the NMC may be arranged to taper down from the turn capture snapshot value rather than immediately setting it to the original normal value.

At decision block 714, in at least one of the various embodiments, if monitoring and capturing should continue, control may loop back to block 702; otherwise, control may be returned to a calling process. In some embodiments, an NMC may continue operating until a user configures it to terminate operations.

Figure 8:
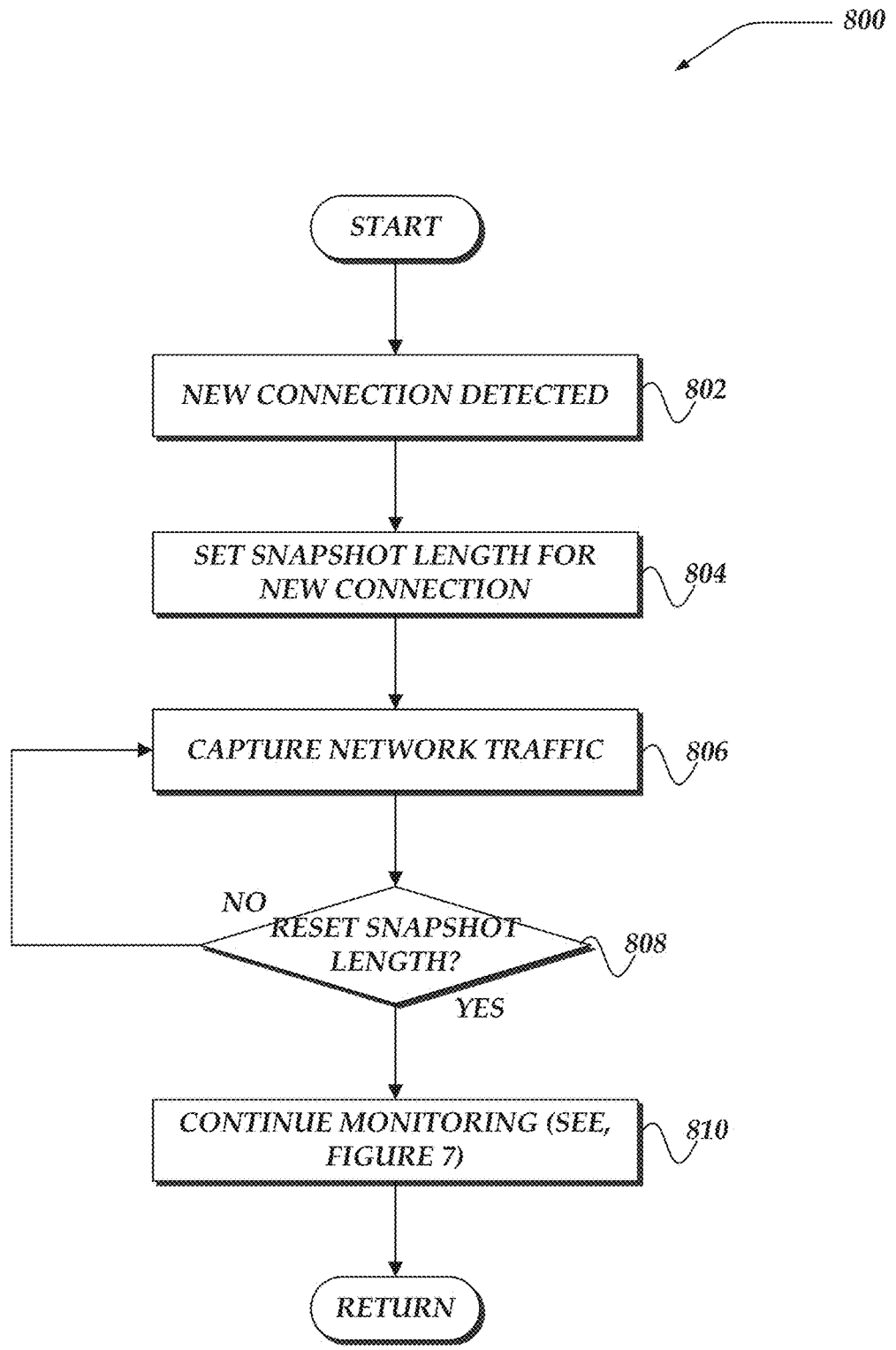
FIG. 8 illustrates a flowchart of a process for continuous packet capture using dynamic snapshot value in accordance with at least one of the various embodiments.

FIG. 8 illustrates a flowchart of process 800 for continuous packet capture using dynamic snapshot value in accordance with at least one of the various embodiments. After a start block, at block 802, in at least one of the various embodiments, an NMC may observe a new connection being established between endpoints in the monitored network. In at least one of the various embodiments, a new connection may be a new network flow between the two endpoints. Also, in some embodiments, the new connection may be identified by having tuple information different than the other flows known by the NMC.

In some embodiments, in some cases, the NMC may consider the network flow a new connection even though the two endpoints have a previously established connection. For example, in a congested/busy networking environment, the NMC may have bumped the connection to make room for other more active connections. For example, the NMC may be arranged to have a connection table for tracking network flows using their tuple information. Accordingly, if the number of connections in the monitored network exceeds the capacity of the connection table, the NMC may apply various policies to determine which connections to bump/remove from the connection table.

At block 804, in at least one of the various embodiments, the NMC may set a snapshot value for the network flow associated with the new connection. In at least one of the various embodiments, the NMC may be arranged to set a value that exceeds the normal snapshot value to enable more complete data capture. In some embodiments, the NMC may be arranged to use the same or similar snapshot value for new connections as it does for turns.

At block 806, in at least one of the various embodiments, the NMC may capture network packets from the network flow associated with the new connection. In at least one of the various embodiments, the packet portion captured may be determined by the snapshot value set at block 804.

At decision block 808, in at least one of the various embodiments, if the snapshot value should be reset, control may flow to block 810; otherwise, control may loop back to block 806. In at least one of the various embodiments, as described above, an NMC may be arranged to employ one or more conditions, rules, pattern matching, heuristics, or the like, or combination thereof, implemented using scripts, compiled computer languages, ASICs, FGPAs, PALs, or the like, or combination thereof, to determine if the snapshot value should be reset to normal.

At block 810, in at least one of the various embodiments, the NMC may be arranged to continue monitoring and/or capturing as described in FIG. 7. Next, control may be returned to a calling process.

In at least one of the various embodiments, the NMC may be arranged and configured to set an particular snapshot value that may be used for exceptions, errors, failures, or the like, where normal snapshot value may not be available or applicable. In this example, new connections may be considered anomalies such that in some embodiments the NMC initially uses the larger turn snapshot value until it is able to reset the snapshot value to a normal value. In some embodiments, the increased snapshot value may be used for new connections until a first turn is seen or the NMC determines other conditions are met that trigger resetting the snapshot value.

Figure 9:
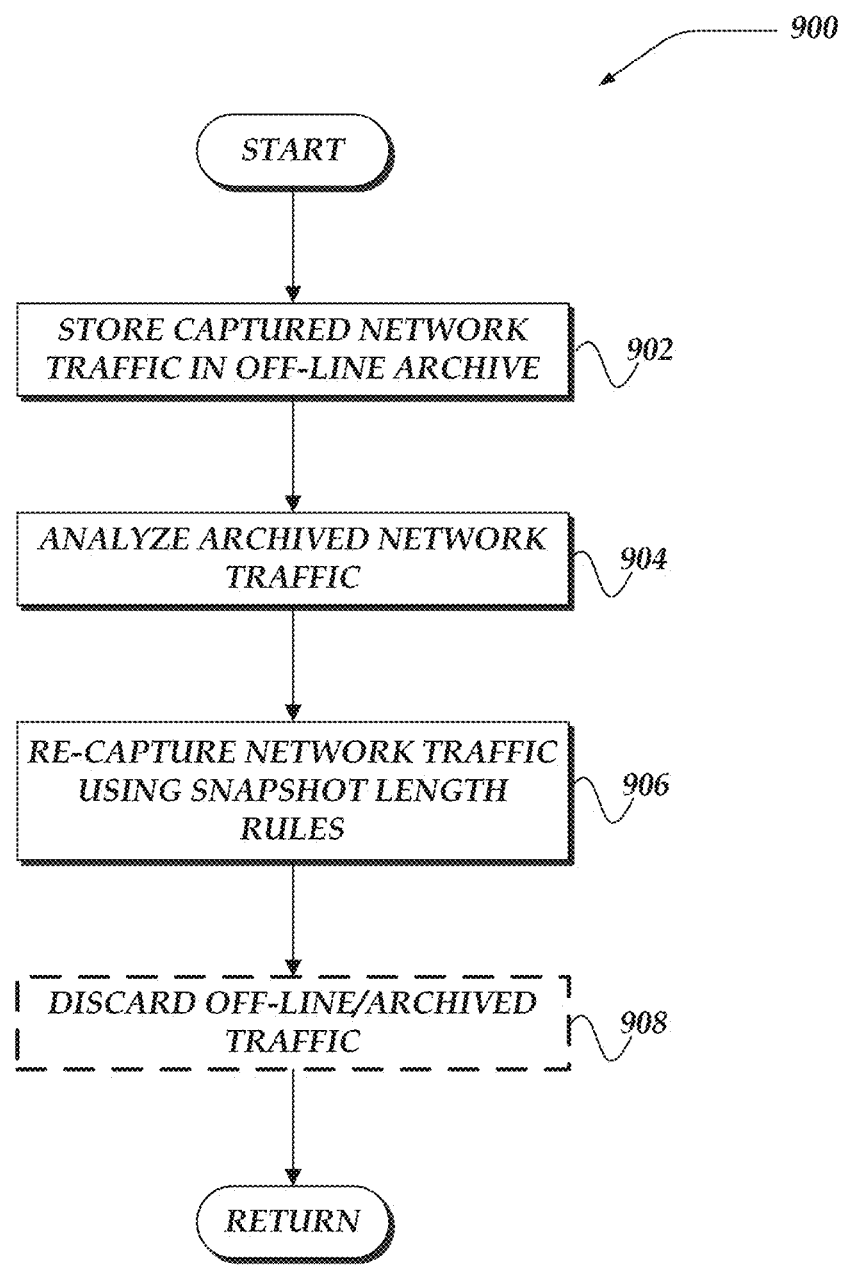
FIG. 9 illustrates a flowchart of a process for packet capture using dynamic snapshot value as applied to archive network traffic in accordance with at least one of the various embodiments.

FIG. 9 illustrates a flowchart of process 900 for packet capture using dynamic snapshot value as applied to archive network traffic in accordance with at least one of the various embodiments. After a start block, at block 902, in at least one of the various embodiments, one or more NMCs, or other network packet capture devices may be configured to capture and archive all network packets for a network or a portion of a network. In at least one of the various embodiments, all of the wire traffic for the network may be stored in archival/off-line storage. In some embodiments, some level of filtering may have been applied to the wire traffic, however the capture data may include entire packets captured without using a snapshot value or packet slicing.

At block 904, in at least one of the various embodiments, one or more NMCs may be arranged and configured to analyze the stored network traffic. In at least one of the various embodiments, the captured network traffic may be replayed or otherwise provided to the NMCs. Accordingly, in some embodiments, the NMCs may be performing monitoring and/or capturing operations on the archived/off-line network packets.

At block 906, in at least one of the various embodiments, the one or more NMCs may be arranged to re-capture the archived/off-line network packets using one or more snapshot value operations as described above. For example, the NMC may use the turn based snapshot value operations to reduce the size of the off-line data by reducing packet capture by employing a snapshot value. As described above, turns may be detected and used to identify packets in the archived/off-line traffic that should be re-captured (e.g., retained) using the turn snapshot value where the remainder may use the normal snapshot value.

At block 908, in at least one of the various embodiments, optionally, the original archive of captured wire-traffic may be discarded. The re-captured traffic provided by the NMC may be retained. This block is marked optional since in some embodiments user may choose to retain the full archive. Next, control may be returned to calling process.

Figure 10:
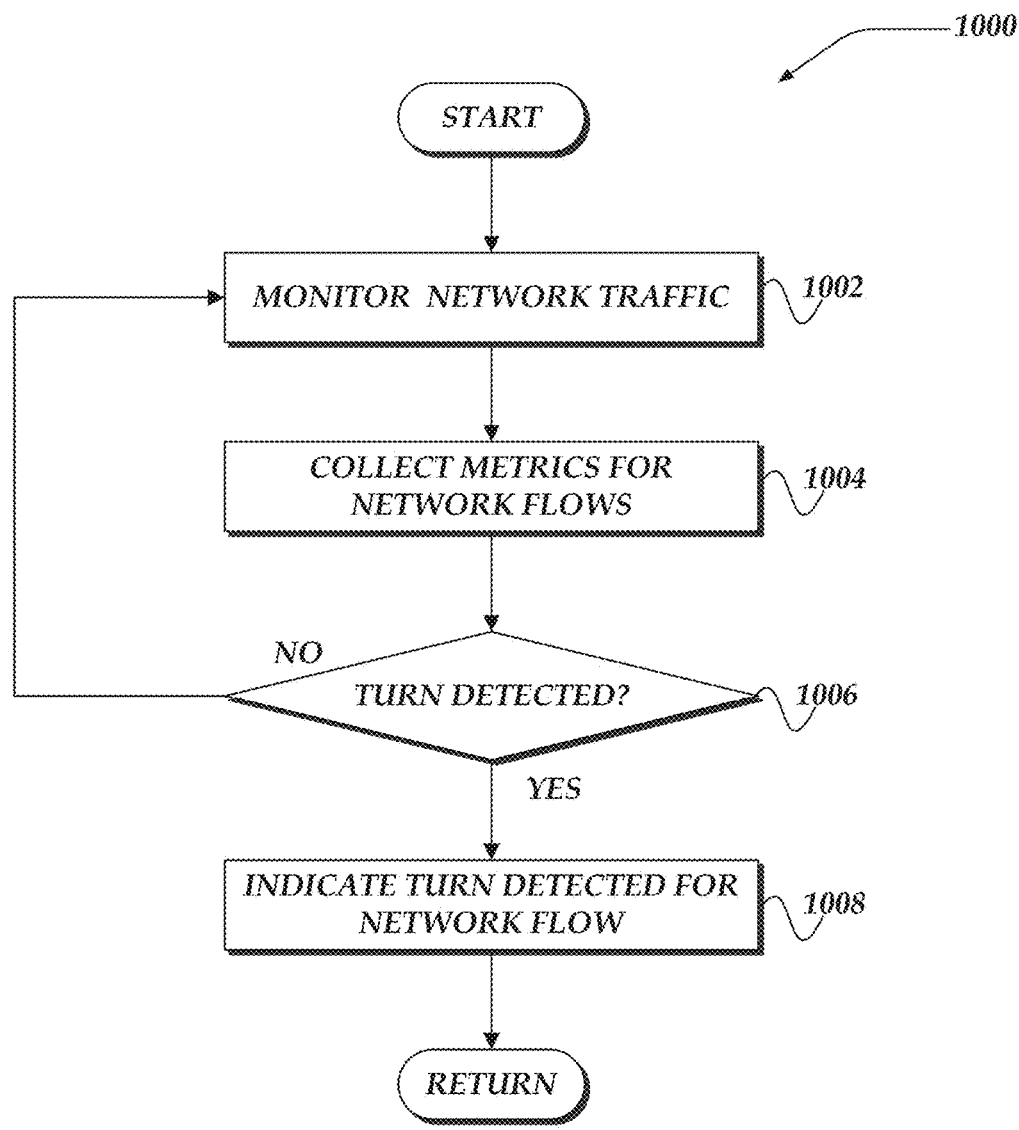
FIG. 10 illustrates a flowchart of a process for detecting network flow turns in accordance with at least one of the various embodiments.

FIG. 10 illustrates a flowchart of process 1000 for detecting network flow turns in accordance with at least one of the various embodiments. After a start block, at block 1002, in at least one of the various embodiments, an NMC may be arranged to monitor network traffic in one or more networks. At block 1004, in at least one of the various embodiments, the NMC may be arranged to collect one or more metrics that may be used to characterize the various observed network flows. In some embodiments, as described above, the NMC may be arranged to employ one or more conditions, rules, pattern matching, heuristics, or the like, or combination thereof, implemented using scripts, compiled computer languages, ASICs, FGPAs, PALs, or the like, or combination thereof, to collect metrics or otherwise characterize the observed network flows.

At decision block 1006, in at least one of the various embodiments, if the NMC detects a turn in one or more of the network flows, control may flow to block 1008; otherwise, control may loop back to block 1002 for continued monitoring.

At block 1008, in at least one of the various embodiments, the NMC may indicate that a network flow is occurring. Accordingly, in some embodiments, operations described above may be employed to dynamically set the snapshot value. Next, control may be returned to a calling process.

It will be understood that each block of the flowchart illustration, and combinations of blocks in the flowchart illustration, can be implemented by computer program instructions. These program instructions may be provided to one or more processors to produce a machine, such that the instructions, which execute on the one or more processors, create means for implementing the actions specified in the flowchart block or blocks. The computer program instructions may be executed by the one or more processors to cause a series of operational steps to be performed by the one or more processors to produce a computer-implemented process such that the instructions, which execute on the one or more processors to provide steps for implementing the actions specified in the flowchart block or blocks. The computer program instructions may also cause at least some of the operational steps shown in the blocks of the flowchart to be performed in parallel and/or concurrently by the one or more processors and/or one or more computers. Moreover, some of the steps may also be performed across more than one processor or computer. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using one or more embedded logic hardware devices instead of one or more CPUs, such as, an Application Specific Integrated Circuits (ASICs), Field Programmable Gate Arrays (FPGAs), Programmable Array Logic chips (PALs), or the like, or combination thereof. The embedded one or more logic hardware devices may directly execute their embedded logic to perform actions. In at least one embodiment, one or more microcontrollers may be arranged as system-on-a-chip (SOCs) to directly execute their own locally embedded logic to perform actions and access their own internal memory and their own external Input and Output Interfaces (e.g., hardware pins and/or wireless transceivers) to perform actions described herein.

What is claimed as new and desired to be protected by Letters Patent of the United States is:

1. A method for capturing packets on a network, wherein one or more processors in a network computer execute instructions to perform actions, comprising:
   providing a snapshot value having a defined amount for one or more network monitoring computers (NMCs); and
   when the one or more NMCs are provided a network flow, performing further actions, including:
      monitoring one or more characteristics of one or more packets in the network flow, wherein the one or more characteristics include one or more of an incoming volume or an outgoing volume of the network flow;
      when the one or more characteristics of the network flow indicate that a turn is occurring on the network flow, providing an increase to the amount of the snapshot value;
      when one or more conditions indicate that the flow turn is complete, providing a decrease to the amount of the snapshot value;
      capturing a portion of each of the one or more packets, wherein a size of the portion is based on the snapshot value; and
      storing the captured portion of each of the one or more packets in a memory of the one or more NMCs.

2. The method of claim 1, wherein the monitoring of the one or more characteristics of the network flow, further comprise:
   including one or more of a change-in-traffic-volume rate, a sequence match, a response delay, a protocol state, or a response latency; and
   identifying the turn based on a change of direction of the network flow, wherein the change of direction is indicated by the one or more characteristics.

3. The method of claim 1, wherein the one or more conditions that indicate that the turn is complete, further comprise: one or more of a count of captured network packets subsequent to the occurrence of the turn that exceeds a defined threshold, a timeout expiry, or a capture byte count threshold is exceeded.

4. The method of claim 1, further comprising:
   storing the one or more packets in a memory buffer;
   when the turn is occurring, capturing the one or more packets in the memory buffer using a current snapshot value; and
   when the memory buffer size is exceeded, discarding one or more of the buffered one or more packets to make more room in the memory buffer.

5. The method of claim 1, further comprising, when a new network flow is provided to the one or more NMCs, performing further actions, including:
   providing an increase to the defined amount of the snapshot value provided for the new network flow; and
   capturing the portion of each of the one or more packets, wherein a size of the portion is equivalent to the snapshot value.

6. The method of claim 1, wherein providing the increase to the amount of the snapshot value further comprises, providing the increase to the amount based on one or more of a network protocol, or an application protocol.

7. The method of claim 1, wherein providing the increase to the amount of the snapshot value further comprises, increasing the amount of the snapshot value to capture all portions of each packet.

8. The method of claim 1, further comprising, providing the one or more packets from an off-line data store.

9. A system for capturing network traffic in a network comprising:
   a network computer, comprising:
      a transceiver that communicates over the network;
      a memory that stores at least instructions; and
      one or more processors that execute instructions that perform actions, including:
   providing a snapshot value having a defined amount for one or more network monitoring computers (NMCs); and
   when the one or more NMCs are provided a network flow, performing further actions, including:
      monitoring one or more characteristics of one or more packets in the network flow, wherein the one or more characteristics include one or more of an incoming volume or an outgoing volume of the network flow;
      when the one or more characteristics of the network flow indicate that a turn is occurring on the network flow, providing an increase to the amount of the snapshot value;
      when one or more conditions indicate that the flow turn is complete, providing a decrease to the amount of the snapshot value;
      capturing a portion of each of the one or more packets, wherein a size of the portion is based on the snapshot value; and
      storing the captured portion of each of the one or more packets in a memory of the one or more NMCs; and
   a client computer, comprising:
      a transceiver that communicates over the network;
      a memory that stores at least instructions; and
      one or more processors that execute instructions that perform actions, including:
   providing one or more portions of the network flow.

10. The system of claim 9, wherein the monitoring of the one or more characteristics of the network flow, further comprise:
   including one or more of a change-in-traffic-volume rate, a sequence match, a response delay, a protocol state, or a response latency; and
   identifying the turn based on a change of direction of the network flow, wherein the change of direction is indicated by the one or more characteristics.

11. The system of claim 9, wherein the one or more conditions that indicate that the turn is complete, further comprise: one or more of a count of captured network packets subsequent to the occurrence of the turn that exceeds a defined threshold, a timeout expiry, or a capture byte count threshold is exceeded.

12. The system of claim 9, wherein the network computer's one or more processors execute instructions that perform actions, further comprising:
storing the one or more packets in a memory buffer;
when the turn is occurring, capturing the one or more packets in the memory buffer using a current snapshot value; and
when the memory buffer size is exceeded, discarding one or more of the buffered one or more packets to make more room in the memory buffer.

13. The system of claim 9, wherein the network computer's one or more processors execute instructions that perform actions, further comprising, when a new network flow is provided to the one or more NMCs, performing further actions, including:
providing an increase to the defined amount of the snapshot value provided for the new network flow; and
capturing the portion of each of the one or more packets, wherein a size of the portion is equivalent to the snapshot value.

14. The system of claim 9, wherein providing the increase to the amount of the snapshot value further comprises, providing the increase to the amount based on one or more of a network protocol, or an application protocol.

15. The system of claim 9, wherein providing the increase to the amount of the snapshot value further comprises, increasing the amount of the snapshot value to capture all portions of each packet.

16. The system of claim 9, wherein the network computer's one or more processors execute instructions that perform actions, further comprising, providing the one or more packets from an off-line data store.

17. A processor readable non-transitory storage media that includes instructions for capturing packets on a network, wherein execution of the instructions by one or more processors performs actions, comprising:
providing a snapshot value having a defined amount for one or more network monitoring computers (NMCs); and
when the one or more NMCs are provided a network flow, performing further actions, including:
monitoring one or more characteristics of one or more packets in the network flow, wherein the one or more characteristics include one or more of an incoming volume or an outgoing volume of the network flow;
when the one or more characteristics of the network flow indicate that a turn is occurring on the network flow, providing an increase to the amount of the snapshot value;
when one or more conditions indicate that the flow turn is complete, providing a decrease to the amount of the snapshot value;
capturing a portion of each of the one or more packets, wherein a size of the portion is based on the snapshot value; and
storing the captured portion of each of the one or more packets in a memory of the one or more NMCs.

18. The media of claim 17, wherein the monitoring of the one or more characteristics of the network flow, further comprise:
including one or more of a change-in-traffic-volume rate, a sequence match, a response delay, a protocol state, or a response latency; and
identifying the turn based on a change of direction of the network flow, wherein the change of direction is indicated by the one or more characteristics.

19. The media of claim 17, wherein the one or more conditions that indicate that the turn is complete, further comprise, one or more of a count of captured network packets subsequent to the occurrence of the turn that exceeds a defined threshold, a timeout expiry, or a capture byte count threshold is exceeded.

20. The media of claim 17, further comprising:
storing the one or more packets in a memory buffer;
when the turn is occurring, capturing the one or more packets in the memory buffer using a current snapshot value; and
when the memory buffer size is exceeded, discarding one or more of the buffered one or more packets to make more room in the memory buffer.

21. The media of claim 17, further comprising, when a new network flow is provided to the one or more NMCs, performing further actions, including:
providing an increase to the defined amount of the snapshot value provided for the new network flow; and
capturing the portion of each of the one or more packets, wherein a size of the portion is equivalent to the snapshot value.

22. The media of claim 17, wherein providing the increase to the amount of the snapshot value further comprises, providing the increase to the amount based on one or more of a network protocol, or an application protocol.

23. The media of claim 17, wherein providing the increase to the amount of the snapshot value further comprises, increasing the amount of the snapshot value to capture all portions of each packet.

24. A network computer for capturing packets in a network, comprising:
a transceiver that communicates over the network;
a memory that stores at least instructions; and
one or more processors that execute instructions that perform actions, including:
providing a snapshot value having a defined amount for one or more network monitoring computers (NMCs); and
when the one or more NMCs are provided a network flow, performing further actions, including:
monitoring one or more characteristics of one or more packets in the network flow, wherein the one or more characteristics include one or more of an incoming volume or an outgoing volume of the network flow;
when the one or more characteristics of the network flow indicate that a turn is occurring on the network flow, providing an increase to the amount of the snapshot value;
when one or more conditions indicate that the flow turn is complete, providing a decrease to the amount of the snapshot value;
capturing a portion of each of the one or more packets, wherein a size of the portion is based on the snapshot value; and
storing the captured portion of each of the one or more packets in a memory of the one or more NMCs.

25. The network computer of claim 24, wherein the monitoring of the one or more characteristics of the network flow, further comprise:
 including one or more of a change-in-traffic-volume rate, a sequence match, a response delay, a protocol state, or a response latency; and
 identifying the turn based on a change of direction of the network flow, wherein the change of direction is indicated by the one or more characteristics.

26. The network computer of claim 24, wherein the one or more conditions that indicate that the turn is complete, further comprise, one or more of a count of captured network packets subsequent to the occurrence of the turn that exceeds a defined threshold, a timeout expiry, or a capture byte count threshold is exceeded.

27. The network computer of claim 24, further comprising:
 storing the one or more packets in a memory buffer;
 when the turn is occurring, capturing the one or more packets in the memory buffer using a current snapshot value; and
 when the memory buffer size is exceeded, discarding one or more of the buffered one or more packets to make more room in the memory buffer.

28. The network computer of claim 24, further comprising, when a new network flow is provided to the one or more NMCs, performing further actions, including:
 providing an increase to the defined amount of the snapshot value provided for the new network flow; and
 capturing the portion of each of the one or more packets, wherein a size of the portion is equivalent to the snapshot value.

29. The network computer of claim 24, wherein providing the increase to the amount of the snapshot value further comprises, providing the increase to the amount based on one or more of a network protocol, or an application protocol.

30. The network computer of claim 24, wherein providing the increase to the amount of the snapshot value further comprises, increasing the amount of the snapshot value to capture all portions of each packet.

* * * * *

UNITED STATES PATENT AND TRADEMARK OFFICE
CERTIFICATE OF CORRECTION

PATENT NO. : 9,584,381 B1
APPLICATION NO. : 15/289760
DATED : February 28, 2017
INVENTOR(S) : Leone Page 1 of 2

It is certified that error appears in the above-identified patent and that said Letters Patent is hereby corrected as shown below:

In the Specification

In Column 4, Line 4, delete "Universal" and insert -- User --, therefor.

In Column 6, Line 14, delete "TCP/IP (IP)" and insert -- TCP/IP --, therefor.

In Column 7, Line 7, delete "followed by" and insert -- followed by data flowing in the other direction (e.g., from network endpoint B to network endpoint A). This --, therefor.

In Column 10, Line 31, delete "(WLAN) networks," and insert -- (WLAN), --, therefor.

In Column 10, Line 41, delete "(4G)" and insert -- (4G), --, therefor.

In Column 10, Line 49, delete "Mobil" and insert -- Mobile --, therefor.

In Column 10, Line 51, delete "Enhanced Data GSM Environment" and insert -- Enhanced Data Rate GSM Evolution --, therefor.

In Column 11, Line 45, delete "include include" and insert -- include --, therefor.

In Column 12, Line 9-10, delete "(GPS) receiver 258," and insert -- (GPS) transceiver 258, --, therefor.

In Column 12, Line 31, delete "OSI model" and insert -- Global System --, therefor.

In Column 12, Line 34, delete "SIP/RTP, GPRS," and insert -- SIP/RTP, --, therefor.

In Column 12, Line 39, delete "(MC)." and insert -- (NIC). --, therefor.

Signed and Sealed this
First Day of May, 2018

Andrei Iancu
*Director of the United States Patent and Trademark Office*

In Column 18, Line 53, delete "employ" and insert -- employed --, therefor.

In Column 19, Line 61, delete "value value" and insert -- value --, therefor.

In Column 21, Line 21, delete "so a" and insert -- to a --, therefor.

In Column 21, Line 47, delete "arranged enable user to" and insert -- arranged to enable the user to --, therefor.

In Column 23, Line 67, delete "capture" and insert -- captured --, therefor.

In Column 25, Line 7, delete "enable more" and insert -- enable a more --, therefor.

In Column 25, Line 31, delete "an particular" and insert -- a particular --, therefor.

In the Claims

In Column 28, Line 25, in Claim 9, delete "network" and insert -- network, --, therefor.